UNITED STATES PATENT OFFICE.

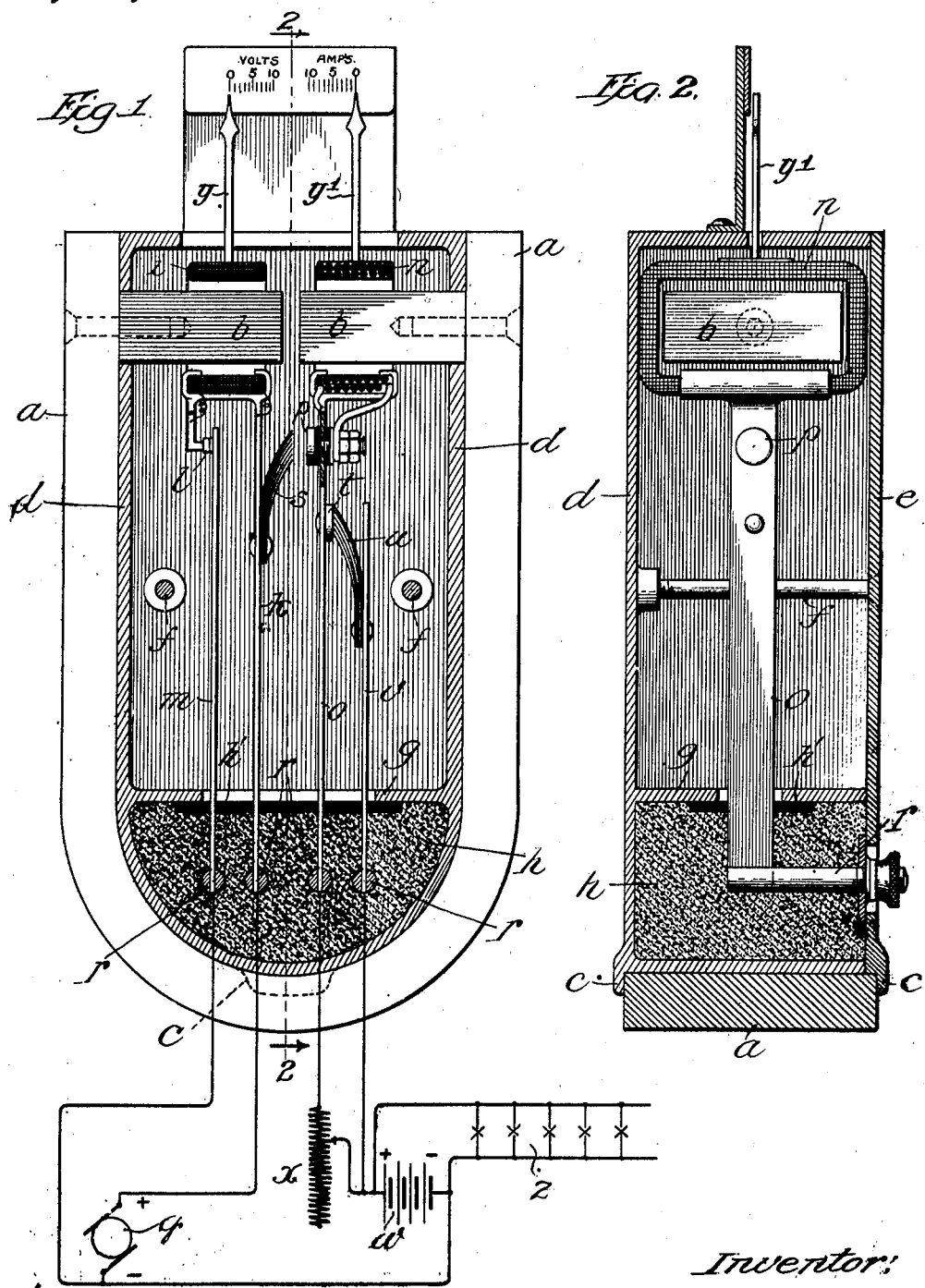

ALBERT E. BERDON, OF LA FAYETTE, INDIANA, ASSIGNOR TO ESTERLINE COMPANY, OF LA FAYETTE, INDIANA, A CORPORATION OF INDIANA.

ELECTRIC-CURRENT-CONTROLLING DEVICE.

1,063,950.
Specification of Letters Patent.
Patented June 10, 1913.

Application filed July 5, 1910. Serial No. 570,239.

*To all whom it may concern:*

Be it known that I, ALBERT E. BERDON, citizen of the United States, residing at La Fayette, in the county of Tippecanoe and State of Indiana, have invented a certain new and useful Improvement in Electric-Current-Controlling Devices, of which the following is a full, clear, concise, and exact description, reference being had to the accompanying drawings, forming a part of this specification.

My invention relates to electric current controlling devices and is of particular service in connection with the charging of storage batteries from a source of current of varying electromotive force such as is common in car lighting systems, although I do not wish to be limited to this use.

One feature of my invention resides in automatic electric circuit closing and opening means dependent for its operation upon the pressure of the impressed electromotive force.

Another feature of my invention resides in automatic means for reducing the strength of current in an electric circuit when such current increases to a predetermined maximum value and for automatically restoring the normal circuit relations after the cause of the excessive current has been removed.

A further feature resides in means for preventing a reversal of current in an electric circuit.

An important characteristic of the preferred form of my invention resides in floating magnetically operated motor elements, all tendency toward magnetic sticking being consequently absent.

A novel characteristic of the preferred form of my invention resides in the use of coils or solenoids rigidly attached to spring supports and surrounding cores which preferably constitute the pole pieces of a magnet, preferably of permanent type, so as to move longitudinally of said pole pieces against the action of supporting springs as a result of the coöperation of the magnetic fields of the magnet and of the coils or solenoids, the extents of said motions depending on the electromotive force and current values in the circuit including my device, and the results of said motions being the desired control of current values in said circuit.

I will explain my invention more fully by reference to the accompanying drawing showing the preferred embodiment thereof and in which—

Figure 1 is a front sectional elevation of a device forming one embodiment of my invention, together with certain external apparatus and circuit connections in association with which my device may be used, and Fig. 2 is a side sectional elevation of my device on line 2—2 of Fig. 1.

Like parts are indicated by similar characters of reference throughout the different figures.

The device of my invention is shown in Fig. 1 in association with a charging generator and a storage battery to be charged thereby, although I do not wish to be limited to this use. The permanent horse shoe magnet $a$ has insetting pole pieces, $b$, preferably separable from the main portion of the magnet. These pole pieces coöperate with the bottom lugs $c$ to secure in position the box or casing $d$ having a removable front portion $e$ secured in place by screws $f$. The casing $d$ has a horizontal partition $g$ forming a compartment in said casing to hold suitable hardening and insulating compound $h$ to maintain in position certain parts to be hereinafter described. The high wound pressure coil or solenoid $i$ is rigidly attached to, and one of its terminals is electrically connected with, the upper end of the conducting spring support $k$, the lower end of which support is firmly held in place by the insulating plate $h'$ and the insulating compound $h$. The second terminal of the pressure coil is electrically connected to the contact $l$ normally in contact with the upper end of the conducting spring $m$, the lower end of which spring is firmly held in place by the insulating plate $h'$ and the insulating compound $h$. Referring to Fig. 1, this pressure coil or solenoid surrounds and is mechanically free of its associate (left hand) pole piece $b$ of the permanent magnet so that a magnetic field produced by a current in this pressure coil will coöperate with the magnetic field of the permanent magnet to cause said pressure coil to move longitudinally of its associate pole piece, said movement carrying the upper end of the support $k$ with the pressure coil. The low wound series or current coil or solenoid $n$ is rigidly attached to, and one of its terminals is electrically connected with, the upper end of the conducting spring support $o$, the lower end of which support is firmly held in place by the insulating plate $h'$ and the insulating compound $h$. The spring supports for the current and pressure coils constitute supporting structures or mechanism allowing the coils to be moved when the coils are energized and which restore the coils to normal positions when deënergized. The second terminal of this current coil or solenoid $n$ is electrically connected to the contact $p$ which is insulated from the support $o$ except for the path through the current coil $n$. Referring still to Fig. 1, the current coil $n$ surrounds and is mechanically free of its associate (right hand) pole piece $b$ of the permanent magnet, so that a magnetic field produced by a current in this current coil will coöperate with the magnetic field of the permanent magnet to cause said current coil to move longitudinally of its associate pole piece, said movement carrying the upper end of the support $o$ with the current coil, the lower end of this support being firmly held in place by the insulating plate $h'$ and the insulating compound $h$. A path for current through the pressure coil $i$ may be traced from the upper (positive) terminal of the generator $q$ through the second binding post $r$ from the left, the spring support $k$, the pressure coil $i$, the contact $l$, the conducting spring $m$, and the left hand binding post $r$ to the lower (negative) terminal of the generator $q$.

The normal polarity of the generator and the direction of the winding of the pressure coil are such that the resulting magnetic field of said pressure coil and the magnetic field of the permanent magnet coöperate to move such pressure coil to the right or toward the current coil $n$, such movement finally causing the brush $s$ to make contact with the contact $p$ to establish circuit through the current coil $n$, which circuit may be traced from the upper (positive) terminal of the generator $q$ through the second binding post $r$ from the left, the support $k$, the brush $s$, the contact $p$, the current coil $n$, the support $o$, the contact $t$, the brush $u$, the spring support $v$ for said brush, the right hand binding post $r$, and the storage battery $w$ or other translating device, to the lower (negative) terminal of the generator $q$. An adjusting resistance $x$ provides a permanent path for current around the contact $t$ and brush $u$ for a purpose which will appear hereinafter. Assuming the generator $q$ to be started from rest and gradually brought to its normal speed, its electromotive force at the same time gradually increasing to its normal valve, the pressure coil $i$ will move gradually to the right (referring to Fig. 1) until the brush $s$ makes contact with the contact $p$ to establish a charging circuit for the battery $w$ as above described, the retarding influence of the elements $m$ and $k$ being such that said charging circuit cannot be established until the electromotive force of the generator is of a suitable value. Thus, the device acts as an automatic circuit closing device under the control of the impressed electromotive force. The normal polarity of the generator and the direction of the winding in the current coil $n$ are such as to establish a magnetic field which will coöperate with the magnetic field of the permanent magnet to tend to move said current coil toward the pressure coil $i$, or to the left as shown in Fig. 1, and the windings of the pressure and current coils are so related that a charging current greater than some predetermined value will cause the tendency of the current coil to move to the left to overcome the tendency of the pressure coil to move to the right, thus permitting a sufficient excess of current to cause both coils to move to the left (Fig. 1) until circuit through the pressure coil is broken at the contact $l$. The opening of the pressure coil circuit at the contact $l$ removes the tendency of the pressure coil to retard movement toward the left of both the pressure and current coils, as a result of which the current coil acts to cause both coils to jump quickly a farther small distance to the left, opening the circuit for the charging current at the contact $t$ and the brush $u$ and causing all of said charging current to pass through the parallel path including the adjusting resistance $x$. The adjusting resistance $x$ serves to prevent a dangerously large current from passing through the battery $w$. As soon as the cause of the excessive current is removed, for instance by a reduction in generator electromotive force or by an increase in the resistance of the external load circuit, the supports $o$ and $k$, by reason of their resiliency, move the current coil back to the right again to close path for the charging current through the contact $t$ and the brush $u$, and to close path through the pressure coil through the contact $l$, the apparatus again assuming its normal charging condition. Thus, the device acts to prevent excessive overload on either the generator or its external load circuit and further acts to restore normal circuit relations as soon as the cause of the excessive overload has been removed. It is clear that a reduction in generator electromotive force below a predetermined value will reduce the tendency of the pressure coil $i$ to move to the right, a movement of said pressure coil to the left resulting as a consequence of the resiliency of the support $k$ and spring $m$, said movement opening circuit for the charging current at the brush $s$ and contact $p$. If, by accident or otherwise, the polarity of the electromotive force of the generator becomes reversed, then the direction of current in the pressure coil $i$ will be reversed and thereby cause such coil to move to the left, thus preventing the possibility of circuit being closed through the current coil $n$ and through the storage battery $w$. Thus, the device acts as a circuit breaker when the source of current fails, when its electromotive force falls below a predetermined value, or when its polarity becomes reversed from any cause, and it further acts to restore normal circuit relations as soon as the cause of its action as a circuit breaker has been removed. A pointer $y$ attached to the pressure coil $i$ is moved by the pressure coil over a suitable associate scale to indicate the voltage impressed on the device by the generator, and a similar pointer $y'$ attached to the current coil $n$ moves over another scale associated with said pointer $y'$ to indicate the current passing through said current coil $n$ and through the external circuit. A lamp load $z$ is shown connected to the storage battery $w$.

The apparatus of my invention is shown as being peculiarly adapted to circuits in which unidirectional currents flow, and when the apparatus is adapted to systems employing unidirectional currents, I employ a magnet of unchanging polarity and prefer to employ a permanent magnet in the environment which has been illustrated and described.

While I have herein shown and particularly described the preferred embodiment of my invention, I do not wish to be limited to the precise details of construction shown, as changes my be readily made without departing from the spirit of the invention, but,

Having thus described my invention, I claim as new and desire to secure by Letters Patent the following:—

1. An electric current controlling device and an electric circuit controlled thereby, said device including a magnet of unchanging polarity; a movable hollow pressure coil subject to the pressure of the controlled circuit and surrounding a pole of said magnet whereby said coil is moved by the coöperation of the magnetic fields produced by the magnet and coil when the coil is energized; a switching device for opening and closing the controlled circuit; and means for restoring the coil to normal position when the coil is deënergized, said coil and magnet coöperating to operate upon the switching device to close said electric circuit at a predetermined minimum value of electromotive force impressed on said pressure coil.

2. An electric current controlling device and an electric circuit controlled thereby, said device including a magnet of unchanging polarity; a movable current coil receiving the current in the controlled circuit and in coöperative relation with said magnet to enable the magnetic fields produced by said magnet and the current flowing in said coil to effect movement of said coil; a switching device for opening and closing the controlled circuit; and means for restoring the coil to normal position when the coil is deënergized, said coil and magnet coöperating to operate upon the switching device to open said electric circuit at a predetermined maximum value of current flowing in said current coil.

3. An electric current controlling device and an electric circuit controlled thereby, said device including a magnet; a movable hollow pressure coil subject to the pressure of the controlled circuit and surrounding a pole of said magnet whereby said coil is moved by the coöperation of the magnetic fields produced by the magnet and coil when the coil is energized; a switching device for modifying the controlled circuit; and means for restoring the coil to normal position when the coil is deënergized, said pressure coil and magnet coöperating to operate upon the switching device to alter said electric circuit at a predetermined minimum value of electromotive force impressed on said pressure coil.

4. An electric current controlling device and an electric circuit controlled thereby, said device including a magnet; a movable current coil receiving the current in the controlled circuit and in coöperative relation with said magnet to enable the magnetic fields produced by the said magnet and the current flowing in said coil to effect movement of said coil; a switching device for modifying the controlled circuit; and means for restoring the coil to normal position when the coil is deënergized, said current coil and magnet coöperating to operate upon the switching device to alter said electric circuit at a predetermined maximum value of current flowing in said current coil.

5. An electric current controlling device, and an electric circuit controlled thereby, said device including a magnet, a current coil receiving current of the controlled circuit and movable with relation to said magnet, and a switching device operable by the current coil in coöperation with the magnet to increase the resistance of said electric circuit when the current in said current coil has increased to a predetermined maximum value.

6. An electric current controlling device and an electric circuit controlled thereby, said device including a magnet of unchanging polarity; a movable current coil receiving the current in the controlled circuit and in coöperative relation with said magnet to enable the magnetic fields produced by said magnet and the current flowing in said coil to effect movement of said coil; means for restoring the coil to normal position when the coil is deënergized; and a switching device operable by the current coil in coöperation with the magnet to increase the resistance of said electric circuit when the current in said current coil has increased to a predetermined maximum value.

7. An electric current controlling device and an electric circuit controlled thereby, said device including a magnet; a movable current coil receiving the current in the controlled circuit and in coöperative relation with said magnet to enable the magnetic fields produced by said magnet and the current flowing in said coil to effect movement of said coil; means for restoring the coil to normal position when the coil is deënergized; and a switching device operable by the current coil in coöperation with the magnet to increase the resistance of said electric circuit when the current in said current coil has increased to a predetermined maximum value.

8. An electric current controlling device and an electric circuit controlled thereby, said device including a magnet of unchanging polarity; a movable hollow pressure coil subject to the pressure of the controlled circuit and surrounding a pole of said magnet whereby said coil is moved by the coöperation of the magnetic fields produced by the magnet and coil when the coil is energized; a switching device for opening and closing the controlled circuit; and means for restoring the coil to normal position when the coil is deënergized, said pressure coil and magnet coöperating to operate upon the switching device to maintain said electric circuit closed under an electromotive force of one polarity impressed on said pressure coil and to operate upon the switching device to maintain said electric circuit open under an electromotive force of the opposite polarity impressed on said pressure coil.

9. An electric current controlling device and an electric circuit controlled thereby, said device including a magnet; a movable hollow pressure coil subject to the pressure of the controlled circuit and surrounding a pole of said magnet whereby said coil is moved by the coöperation of the magnetic fields produced by the magnet and coil when the coil is energized; a switching device for modifying the controlled circuit and means for restoring the coil to normal position when the coil is deënergized, said pressure coil and magnet coöperating to operate upon the switching device to maintain said electric circuit in one condition under an electromotive force of one polarity impressed on said pressure coil and to operate upon the switching device to maintain said electric circuit in another condition under an electromotive force of the opposite polarity impressed on said pressure coil.

10. An electric current controlling device and an electric circuit controlled thereby, said device including a magnet of unchanging polarity; a movable pressure coil subject to the pressure of the controlled circuit and a movable current coil receiving the current in the controlled circuit, both of said coils being in coöperative relation with said magnet whereby the magnetic fields produced by said magnet and the current in said coils effect movement of said coils; a switching device for opening and closing the controlled circuit; and means for restoring the coils to normal positions when deënergized, the pressure coil coöperating with the magnet to operate upon the switching device to close said electric circuit at a predetermined minimum value of electromotive force impressed on said pressure coil, said current coil and magnet coöperating to operate upon the switching device to open said electric circuit at a predetermined maximum value of current in said current coil.

11. An electric current controlling device and an electric circuit controlled thereby, said device including a magnet; a movable pressure coil subject to the pressure of the controlled circuit and a movable current coil receiving the current of the controlled circuit, both of said coils being in coöperative relation with said magnet whereby magnetic fields produced by said magnet and the current in said coils effect movement of said coils; a switching device for modifying the controlled circuit; and means for restoring the coils to normal positions when deënergized, said coils coöperating with each other and with the magnet in operating upon the switching device to effect control of said circuit.

In witness whereof, I hereunto subscribe my name this 25 day of June, A. D., 1910.

ALBERT E. BERDON.

Witnesses:
L. G. BUELTZINGSLOEWEN,
Mrs. L. G. BUELTZINGSLOEWEN.